(12) United States Patent
Fowler

(10) Patent No.: US 7,115,315 B2
(45) Date of Patent: Oct. 3, 2006

(54) REINFORCED SECONDARY BACKING FABRIC AND METHOD OF USING THE SAME

(75) Inventor: Gregory D. Fowler, Rocky Face, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 297 days.

(21) Appl. No.: 10/655,355

(22) Filed: Sep. 4, 2003

(65) Prior Publication Data

US 2005/0053760 A1    Mar. 10, 2005

(51) Int. Cl.
*D05C 17/02*    (2006.01)
*D05C 15/04*    (2006.01)
*B32B 33/00*    (2006.01)

(52) U.S. Cl. ......................................... 428/95; 156/72
(58) Field of Classification Search ................. 428/95; 442/185, 208, 209, 212; 156/72
See application file for complete search history.

(56) References Cited

U.S. PATENT DOCUMENTS

| | | | |
|---|---|---|---|
| D168,422 S | 12/1952 | Rose | |
| 2,713,012 A | 7/1955 | Hartstein | |
| 2,968,856 A | 1/1961 | Allen | |
| 3,309,259 A * | 3/1967 | Schwartz | 428/95 |
| 3,688,804 A | 9/1972 | Brown et al. | |
| 3,922,454 A | 11/1975 | Roecker | |
| 4,086,381 A | 4/1978 | Cheshire et al. | |
| 4,096,302 A | 6/1978 | Thibodeau et al. | |
| 4,138,519 A * | 2/1979 | Mitchell | 428/95 |
| 4,145,467 A * | 3/1979 | Malik | 428/91 |
| 4,171,395 A | 10/1979 | Tillotson | |
| 4,197,343 A | 4/1980 | Forsythe | |
| 4,305,986 A | 12/1981 | Hartmann et al. | |
| 4,376,146 A | 3/1983 | Juhasz et al. | |
| 4,384,018 A * | 5/1983 | Caswell et al. | 428/95 |
| 4,406,310 A | 9/1983 | Reader et al. | |
| 4,426,415 A | 1/1984 | Avery | |
| 4,556,602 A | 12/1985 | Williams | |
| 4,563,378 A | 1/1986 | Roth | |
| 4,661,380 A | 4/1987 | Tillotson | |
| 4,705,706 A | 11/1987 | Avery | |
| 4,743,330 A | 5/1988 | Tillotson | |
| 4,841,749 A | 6/1989 | Petracek et al. | |
| 4,849,267 A | 7/1989 | Ward et al. | |
| 4,877,669 A | 10/1989 | Endrenyi, Jr. et al. | |

(Continued)

FOREIGN PATENT DOCUMENTS

NZ    0500197    5/2001

(Continued)

*Primary Examiner*—Cheryl A. Juska
(74) *Attorney, Agent, or Firm*—Merchant & Gould, LLC

(57) ABSTRACT

A reinforced secondary backing and method of using the same, in which the reinforced secondary backing includes reinforcing yarns interconnect to the secondary backing fabric. The reinforcing yarns generally extend in the longitudinal or warp direction and provide additional surface area to which an adhesive may bind when combining the reinforced secondary backing to a primary backing in forming a laminate carpet. The reinforcing yarns may be spaced across at least a portion of the backing uniformly, concentrated in an area that typically displays weakness (such as adjacent the edges of the carpet), or a combination thereof. It is noted that this abstract is provided to comply with the rules requiring an abstract that will allow a searcher or other reader to ascertain quickly the subject matter of the technical disclosure and is submitted with the understanding that it will not be used to interpret or limit the scope or meaning of the claims.

15 Claims, 6 Drawing Sheets

U.S. PATENT DOCUMENTS

| | | | |
|---|---|---|---|
| 4,931,343 A | 6/1990 | Becker et al. | |
| 4,939,036 A | 7/1990 | Reith | |
| 4,988,551 A | 1/1991 | Zegler | |
| 5,484,639 A | 1/1996 | Woodall et al. | |
| 5,714,224 A | 2/1998 | Gerry | |
| 5,902,663 A | 5/1999 | Justesen et al. | |
| 5,922,462 A | 7/1999 | Kent et al. | |
| 5,962,101 A | 10/1999 | Irwin, Sr. et al. | |
| 6,007,893 A | 12/1999 | Merkel et al. | |
| 6,060,145 A | 5/2000 | Smith et al. | |
| 6,162,848 A | 12/2000 | Lattime et al. | |
| 6,180,166 B1 | 1/2001 | Wood et al. | |
| 6,299,715 B1 | 10/2001 | Langsdorf et al. | |
| 6,316,108 B1 | 11/2001 | Tabor et al. | |
| 6,344,254 B1 | 2/2002 | Smith et al. | |
| 6,435,220 B1 | 8/2002 | Smith et al. | |
| 6,475,592 B1 | 11/2002 | Irwin | |
| 6,479,125 B1 | 11/2002 | Irwin, Sr. | |
| 6,503,595 B1 | 1/2003 | Kim et al. | |
| 6,510,872 B1 * | 1/2003 | Smith et al. | 139/383 R |
| 6,599,600 B1 | 7/2003 | Wyman | |
| 6,776,109 B1 * | 8/2004 | Segars et al. | 112/80.23 |
| 6,782,838 B1 * | 8/2004 | Segars et al. | 112/475.23 |
| 6,863,090 B1 * | 3/2005 | Smith et al. | 139/426 R |
| 2002/0074073 A1 | 6/2002 | Hamrick et al. | |
| 2002/0134486 A1 | 9/2002 | Brumbelow et al. | |
| 2003/0072911 A1 | 4/2003 | Higgins et al. | |
| 2003/0082334 A1 | 5/2003 | Zafiroglu | |
| 2004/0077242 A1 * | 4/2004 | Layman | 442/225 |

FOREIGN PATENT DOCUMENTS

| | | |
|---|---|---|
| WO | WO 96/29460 | 9/1996 |
| WO | WO 01/53069 | 7/2001 |
| WO | WO 03/008701 | 1/2003 |

* cited by examiner

REINFORCED SECONDARY BACKING FABRIC AND METHOD OF USING THE SAME

BACKGROUND OF THE INVENTION

1. Field of the Invention

The present invention relates generally to a reinforced secondary backing and, more particularly, to carpets that use the reinforced secondary backing and a method of forming a carpet with that reinforced secondary backing.

2. Background

Laminate carpets typically include a secondary backing forming their lower surface and a primary backing tufted with yarns forming their upper surface. Latex is often the adhesive used to bond the primary and secondary surfaces together. That latex, or binder, is usually applied between the primary and secondary backings and then immediately "sandwiched" between these two backings by compressing marriage rollers. The formed carpet next passes through an oven where water is removed from the latex to cure it. The cured latex binds the tufted primary backing to the secondary backing and the formed laminate carpet is then ready to be installed in a residential or commercial setting.

As one skilled in the art appreciates, the secondary backing is stretched apart by pulling its edges away from each other during the processing. In addition there may be some contraction when the secondary backing is exposed to heat in the curing oven during the manufacturing process; however, the opposed edges of the secondary backing are held stationary relative to each other when subject to this heating and associated shrinkage. Thus, although the secondary backing contracts from the heat during the manufacturing process, its width is maintained at a set distance so that the dimensions of the carpet remain substantially constant.

Another problem, however, arises from the secondary backing being stretched, namely, stresses develop in the secondary backing and weaken the final carpet structure. More specifically, the resulting tension from the stretching or pulling of the secondary backing can break mechanical bonds that its yarns initially form with the latex.

The normal method used to measure the adhesion or holding strength between the secondary backing and the primary backing is to determine "delamination strength." Delamination strength represents the "peel resistance" characteristics of secondary carpet backing or, stated differently, the force required to separate the secondary backing from the rest of the carpet.

Another issue related to carpet durability is the tendency of the yarns to separate from the primary backing, which is the "tuft bind." That is, tuft bind measures the force necessary to pull the tufted yarn from the laminate carpet. Among other factors, tuft bind is a function of delamination strength. Accordingly, it is desirable for delamination strength to be as high as possible to decrease the likelihood of separation of the secondary backing from the rest of the carpet, increase resistance to tufts being pulled out of the carpet, and enhance dimensional stability of the carpet.

To achieve suitable delamination strength, the secondary backing should be in intimate contact with the tufted primary backing and backstitch during the forming and curing process. In addition, the secondary backing must be firmly bonded with and into the adhesive; otherwise, it will be easier to pull the secondary backing away from the primary backing—and correspondingly easier to pluck yarn from the face of the laminate carpet.

As noted above, however, that secondary backing is pulled tautly during manufacturing and then tries to shrink or contract when it is exposed to heat while its edges are maintained at a constant separation distance from each other. Based on the dynamics of the shrinkage, the stresses are not evenly distributed across the width of the secondary backing; instead, those stresses are concentrated at the edges of the carpet. For example, in a twelve (12) foot wide carpet, approximately eighty percent (80%) of resulting weakness from this shrinkage and associated tension exists in the area from the edge extending inwardly approximately four to twelve (4–12) inches. Thus, as those skilled in the art appreciate, the resultant weakness in the formed carpet is most pronounced near its edges.

To address this problem of low delamination strength adjacent the carpet edges, one attempted solution has been for carpet manufacturers to increase the weight of adhesive applied to the secondary backing. The obvious drawback to this manufacturing modification is the corresponding cost increase of the carpet, as adhesive is an expensive component in laminate carpets. This attempted solution of uniformly increasing adhesive also does not address the differential in strength between the areas adjacent the edges of the carpet and the areas farther inward from the edges.

Another attempted solution to this problem has been for carpet manufacturers to increase the quantity or weight of adhesive applied near the edges of the secondary backing. For example, carpet manufacturers may apply adhesive at a rate of an extra two to four ounces per square yard in the area of the secondary backing spanning from its edges to six to eight inches inward. As noted above, the extra adhesive increases the cost of the laminate carpet. In addition, this additional adhesive applied to the edges may result in uneven curing, as the edges take longer to cure than the interior sections of the carpet.

Therefore, a need exists in the art to increase effectively the delamination strength of carpet, particularly near its edges. A need also exists to be able to increase the delamination strength of carpet at selected areas based on the intended use of the carpet. For example, it may be desired to raise the delamination strength in the center of the carpet if it is anticipated that the carpet will be longitudinally cut at that location before use or installation.

SUMMARY OF THE INVENTION

The present invention provides a reinforced secondary backing that may be used to form a carpet. In the preferred embodiment, the present invention comprises the secondary backing fabric and a plurality of reinforcing yarns interconnected with that fabric. The fabric preferably has a plurality of longitudinal or warp extending yarns intermeshed with a plurality of lateral or weft extending yarns that form a scrim or mesh. The reinforcing yarns are interconnected to the fabric to extend substantially in the longitudinal or warp direction.

One embodiment of the reinforced secondary backing of the present invention comprises a plurality of spaced-apart reinforcing yarns interwoven into the fabric. As an example of another embodiment, the reinforced secondary backing comprises non-woven reinforcing fibers that are joined to the secondary fabric, such as by being needle punched.

The reinforcing yarns preferably have a "rough" texture that provides better mechanical adhesion between the adhesive and the reinforced secondary backing, as compared to using the secondary material without the reinforcing yarns.

Testing has shown that a laminate carpet formed with a conventional 16×5 leno weave secondary backing—a fabric with the warp extending yarns being tape yarns leno woven in pairs and the lateral, weft yarns being staple yarns—has a delamination strength near its edges of approximately two and a half to four (2.5–4) pounds. Keeping all other aspects of the carpet constant except substituting the conventional with the reinforced secondary backing—specifically an embodiment using interwoven warp staple yarns—the delamination strength increases over twenty percent or more. This increase in delamination strength translates to better and more desirable carpets.

Of course, if the current delamination strength in the prior art laminate carpets is acceptable, then the amount of adhesive used to form carpets utilizing the reinforced secondary backing of the present invention can be reduced. Less adhesive translates into a cost savings both in terms of materials used and faster production speeds through the manufacturing line (e.g., faster through the carpet coaters and curing oven). As an alternative to decrease price of the final laminate carpet, the pic count of the secondary backing fabric can be reduced if the current delamination strength in the prior art laminate carpets is acceptable.

Also of note, the present invention can be used to selectively target specific areas of weakness, such as the areas near the edge of the carpet that experience the greatest stresses—and corresponding weaknesses—from stretching and heating. Thus, the delamination strength of the carpet can be made more uniform across its width. In conjunction, using the reinforced secondary backing to increase the delamination strength adjacent the edges may remove the need to use an edge coating of extra adhesive. Since edge coating is usually performed by a second application of adhesive, omitting this step increases the efficiency of the manufacturing process. And, leaving out the edge-coating step promotes more uniform curing of the latex.

It is also contemplated that the reinforcing yarns may be spaced at desired, set intervals across a portion of the width of the carpet, thus evenly increasing the overall strength of the carpet. A combination design is also contemplated, in which reinforcing yarns are positioned at predetermined intervals across the width of the carpet and additional reinforcing yarns are further included at locations where weakness usually exists. For example, one contemplated embodiment of the present invention comprises a reinforcing yarn woven or threaded along longitudinal rows at one-inch intervals and, for the four to six inches adjacent each of the edges, there are two to four reinforcing yarn interwoven per inch.

The present invention, accordingly, provides a reinforced secondary backing that is designed to increase the delamination strength of a carpet formed with it. Ancillary benefits may include improving the dimensional stability of the carpet and increasing the tuft bind. Further benefits potentially include decreasing the manufacturing costs of the carpet by reducing the amount of adhesive used to obtain the same or greater delamination strength (as compared to a carpet manufactured with a corresponding conventional secondary backing fabric).

DETAILED DESCRIPTION OF THE INVENTION

The present invention is more particularly described in the following examples that are intended as illustrative only since numerous modifications and variations therein will be apparent to those skilled in the art. As used in the specification and in the claims, "a," "an," or "the" can mean one or more, depending upon the context in which it is used. The preferred embodiment is now described with reference to the figures, in which like numbers indicate like parts throughout the figures.

Figure 1:
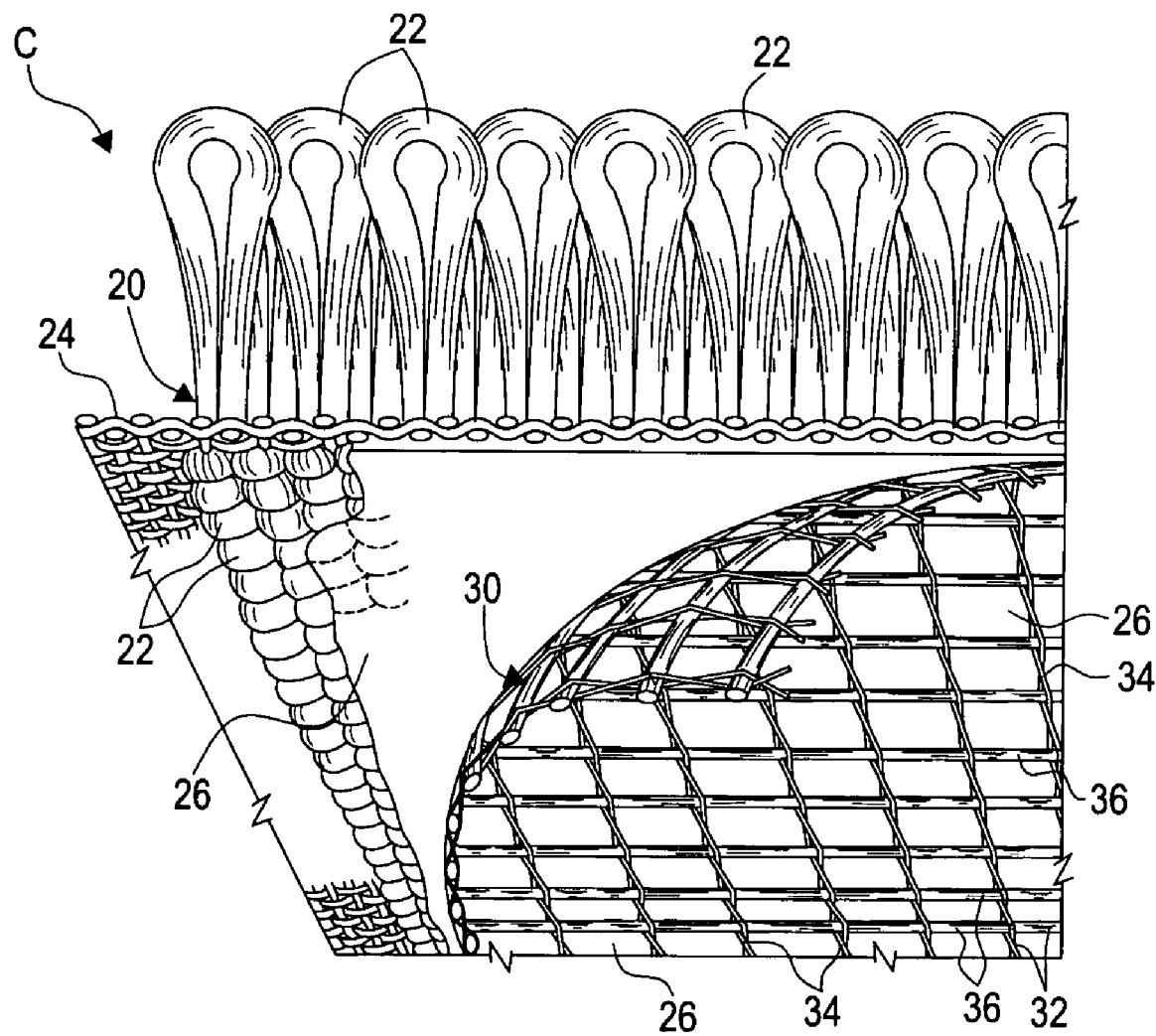
FIG. 1 is a partially exploded perspective view of a typical laminate carpet known in the prior art.

Referring first to FIG. 1, the representation shows a partially expanded perspective view of a typical construction of laminate carpet C. The carpet C includes a face portion made up of yarn 22 that has been tufted into a primary backing 24 using a process that is well known in the art. The primary backing 24 tufted with yarn 22 is commonly referred to as "griege goods" 20.

While the carpet C illustrated in FIG. 1 shows yarn 22 formed in loops, the present invention is not limited to a particular construction to form the face of the carpet. To that end, other tufted face constructions such as cut pile, textured cut pile, and tip sheared, as well as non-tufted face constructions such as needle punch, woven and fusion bonded, fall within the scope of the present invention. Also, the materials that form the yarns 22 are often synthetic fibers such as nylon, but may also include polyolefins, polyamides, polyesters, polyethylene terephthalate (PET), polytrimethylene terephthalate (PTT), natural fibers and mixtures thereof. Still other options to form the yarns 22 are naturals or biopolymers.

Likewise, the present invention is not limited to a particular material or structure to form the primary backing 24. U.S. Pat. No. 4,556,602, which is incorporated herein by reference in its entirety, discloses a woven primary backing. As those skilled in the art appreciate, the primary backing 24 is typically formed of polypropylene that is woven, but may also be formed of other materials such as polyesters, jute, hemp, composites, blend, nylons, and cottons. Still other primary backing designs include cellulosic non-wovens and other non-wovens. There are numerous weaves that can be used to form the primary backing, such as plain, twill, and satin. As those skilled in the art appreciate, some common primary backings have the following designations: 24×11; 24×13; 24×15; and 24×21.

After being tufted, the greige goods 20 are typically stored on a roll for later use in another manufacturing line that, for example, may combine the greige goods 20 with an adhesive 26 and a second backing 30. Typically, the greige goods 20 are removed from a storage roll by being unwound and horizontally moved upside down so that the reverse of the primary backing 24 faces upward and is oriented substantially planar or flat. As the greige goods 20 move along the manufacturing line away from the storage roll, an adhesive 26, such as latex, is cast or coated onto its upwardly facing bottom surface.

The latex 26 deposited onto the reverse of the greige goods 20 is commonly referred to as a "precoat." Such a process typically uses a doctor blade, which can take the form of a rigid blade, straight blade, or bent blade and is positioned slightly downstream of the location at which the precoat is deposited onto the greige goods 20. This doctor blade spreads the latex 26 in the width and height dimensions and also advantageously forces the latex into the tufted yarn 22 on the backside of the primary 24 for "locking" the components together upon curing. One skilled in the art will also appreciate that other precoat application methods can also be used, such as using a roll coater, and the coating may optionally be controlled in thickness by either a blade, rod, air knife, or the like. Regardless of the latex application process, a pressure roller may also be used downstream of the doctor blade to improve tuft bind further, which results in preventing removal of carpet yarns 22 from the laminate carpet C face by pulling or snagging.

Although the present invention is not limited to any particular adhesive 26, potential latex formulations include vinyl polymers comprising polymers or copolymers of hydrocarbon alkenes (including ethylene, propylene, and butylene), acrylonitrile, vinyl acetate, acrylic acid or its alkyl ester, alpha or beta-alkyl acrylic acid or its alkyl esters, including methacrylic acid and methacrylate, styrene, vinylidene chloride, vinyl chloride, and dienes including butadiene. Specific and non-limiting examples of copolymers include vinyl acetate-ethylene ("VAE"), ethylene-vinyl acetate ("EVA"), styrene-butadiene, latex polyvinyl chloride, polyvinylidene chloride, vinyl acetate acrylic acid, styrene acrylic acid, acrylonitrile copolymers, or blends of these compounds. The precoating may also include flame-retardant filler, such as aluminum trihydrate, calcium carbonate, barium sulfate, or the like. Such fillers may also be used to reduce latex costs. The precoat may also be an extruded "hot melt" material which, when cured and cooled, solidifies and binds the yarns 22 to the primary backing 24. In addition, other adhesives known in the art may be used with the present invention.

Next in the carpet manufacturing process, the moving web of the partially formed carpet reaches the location where the secondary backing 30 is merged into the precoat 26. The secondary backing 30 typically comprises a woven fabric mesh 32, which is sometimes referred to as a scrim. Another example of a secondary backing includes a "fiber batt" in addition to the scrim, and is disclosed in U.S. Pat. No. 6,344,254, which is incorporated herein by reference in its entirety.

The specific design of the reinforced secondary backing 40 of the present invention is discussed in more detail below. One skilled in the art, however, will appreciate that this and other methods for constructing carpet described herein and other methods may be used with either the reinforced secondary backing 40 of the present invention or a conventional secondary backing 30; that is, the reinforced and conventional secondary backings 40, 30 may be considered to be interchangeable in terms of manufacturing carpet.

During the manufacturing process, the secondary backing 30 or 40 is usually unrolled from its storage roll to travel at the same relative speed as the greige goods 20 to which the precoat 26 has been applied. During this time, the secondary backing 30 is held adjacent its edges by clamps or tracks and is stretched tautly, which is referred to as pre-tenter. Once it is unrolled, the secondary backing 30 or 40 may be coated with an adhesive 26, such as latex. Although the present invention is not limited to any particular process to apply the adhesive (if at all), one potential application method uses a skip roll, which rotates in trough filled with the adhesive 26, and applies the adhesive to the secondary backing 30 or 40. The quantity of adhesive 26 deposited onto the secondary backing 30 or 40 is typically much lighter than that applied to the primary backing 24, for example, approximately one third of the weight.

The secondary backing 30 or 40 is then directed to be deposited or laid onto the precoat 26 disposed on the reverse of the greige goods 20. After the adhesive 26 of the secondary backing 30 or 40 engages the precoat 26 of the greige goods 20, the carpet structure is "sandwiched" together via marriage rollers. The pressure exerted by the marriage rollers promotes the flow of the adhesive 26 into and around the fibers or yarns 20 of the primary and secondary backings 24, 30 or 40 and between the tuft stitches. With a woven secondary backing fabric 32, the adhesive 26 usually surrounds the yarns 34, 36 and occupies a portion of the interstitial areas formed by those yarns. The adhesive 26 may also completely encapsulate those woven yarns 34, 36 forming the secondary backing fabric 32.

After exiting the marriage rollers, the moving web of the carpet components are tentered, meaning that the carpet being formed is securely held at its opposed edges by clamps or frames on the conveyor to ensure that the carpet does not become repositioned or change in size, such as shrinking in width. In fact, when the carpet is tentered, it is stretched so that the width widens (e.g., an approximately twelve foot wide carpet may be stretched two to four inches in width).

The carpet then passes through an oven, which heats the greige goods 20, secondary backing 30 or 40, and adhesive 26 to a desired temperature. This heating removes water from the adhesive 26 and cures it. The ovens often heat using an infrared energy source, but may also employ a more conventional system such as gas heating (such as natural gas) or heated plates. It is also contemplated using a high-velocity hot-air dryer, which blows hot air to remove the moisture expelled from the adhesive 26 during its heating.

The curing process in the oven causes the adhesive 26 to gel and thus to bond or fuse with the primary backing 24, the backs of the yarns 22 tufted into the primary backing 24, and the secondary backing 30 or 40. The resultant product from this process is the laminate carpet C or 10. The finished carpet is then cooled and taken up on large storage rolls for shipment to the customer.

There are other manufacturing processes known by those skilled in the art using a secondary backing 30, all of which the are applicable to the present invention. One example is disclosed in U.S. patent application Ser. No. 10/077,609, which is owned by the same assignee as the present application and is incorporated herein by reference in its entirety. Other examples of such a disclosure include U.S. Pat. Nos. 6,299,715; 6,180,166; 5,902,633; 4,849,267; and 4,743,330 and U.S. patent application Ser. Nos. 09/993,864 and 10/198,238, all of which are also incorporated herein by reference in their entries by reference.

As noted above, the secondary backings typically comprise a woven fabric or mesh 32. The secondary backing fabric has a longitudinal or "machine direction" known to those skilled in the art as the warp direction W (shown in FIG. 3). The phrase "machine direction" is intended to indicate the direction in which the carpet is tufted. The "fill direction" or "weft direction," in comparison, is oriented substantially perpendicular to the warp orientation W and thus extends laterally across the width of the material.

One conventional secondary backing 30 commonly used in the carpet industry is a woven fabric 32 having tape yarns 34 extending in the longitudinal, warp direction. A tape yarn is an extruded filament that has a substantially rectangular cross-section, and thus is also sometimes referred to as a ribbon yarn. These tape yarns are often extruded from polyamides and polyolefins, particularly polypropylene. Because of the tape yarns are generally smooth and generally impervious, latexes and other adhesives do not always form strong mechanical bonds with them. As such, a secondary backing fabric 32 formed exclusively of tape yarns exhibits less than desirable adhesion with the latex 26 and results in lower lamination strength.

To address this issue, it is common for a conventional secondary backing 30 to use a different type of yarn 36 in the weft or fill direction, namely, staple yarns. Staple yarns are made from a multitude of relatively short fibers that are spun together to produce a synthetic yarn having a "hairy" appearance. The staple or spun yarns, accordingly, are fiberous, making them more receptive to the latexes and bonding therewith. Of course, staple yarns may be used in both the warp and fill directions to form the secondary backing, but for economical considerations, spun yarns are typically used only in the weft or fill direction (i.e., the cost of staple yarns is greater than that of tape yarns). The staple yarns are also commonly formed of synthetic materials, again typically polypropylene. However, other plastics and natural materials, such as jute, may be used to form the staple yarns.

As shown in FIGS. 1–6, in forming a woven secondary backing fabric 32 having warp-extending tape yarns 34 intermeshing with weft-extending staple yarns 36, it is common to leno weave the tape yarns. That is, a leno weave involves the warp yarns 34 being arranged in pairs and woven in a manner so that the pairs of warp yarns 34 are twisted between and after intersecting with each weft yarn 36. The secondary backing fabrics 32 formed with warp yarns 34 using a leno weave demonstrate improved stability when used in a laminate carpet.

Although the present invention is not so limited, it is most common in the carpet industry to use all synthetic secondary backing fabrics 32 using a leno weave pattern with polypropylene tape yarns in the warp direction and a polypropylene staple yarn in the weft direction. One such scrim 32 often uses a 16×5 weave, in which the warp extending yarns 34 use a leno weave and have about 16 ends per inch and the weft yarns 36 have about 5 pics per inch. Other common secondary backing fabrics commercially available include the following: 16×3.5; 16×4; 16×6; 18×11; and 18×13.

As those skilled in the art appreciate, the adhesion of these fabrics 32 may be further improved by being subjecting to mechanical action such as brushing, sanding or the like. Generally such mechanical action is confined to one side of the fabric 32 and the result is to provide a "fuzzier" texture, which has more surface area to which the latex or other adhesive may mechanically bond.

Many secondary backings 30, however, do not bond with the adhesive 26 and rest of the laminate carpet C as strongly as desired. To address this issue, the present invention comprises a reinforced secondary backing 40 to which yarns 42 or 44 are interconnected in the generally warp or longitudinal direction, exemplary embodiments of which are shown in FIGS. 2–6. These yarns are referred to as "reinforcing yarns" 42, 44 and assist in forming a stronger bond with adhesives 26 in a laminate carpet 10. The reinforcing yarns 42 or 44, in fact, provide and add more surface area so that the latex 26 or other binder material used to join the secondary backing 40 to the primary backing 24 has more locations or places to which the adhesive 26 can adhere. This stronger bond correspondingly increases the delamination strength of the formed laminate carpet 10.

The reinforcing yarns 42, 44 used with the present invention may be any known yarn. The preferred yarn is a staple yarn as a result of its texture and associated bonding ability with the adhesive. However, yarns besides staple yarns may be used, including, but not limited to, monofilament yarns having an exaggerated crimp, contoured shape, or textured exterior adapted to create additional surfaces and interstices to which the adhesive may adhere. In particular, it is contemplated using a tape yarn that has been fibrillated to have more texture, such as a courser consistency and irregular shapes in its surface to provide an improved bonding surface with the adhesive. Still other contemplated reinforcing yarns include entangled yarns, knit-de-knit crinkle yarns, and core-bulked yarns.

The reinforcing yarns 42, 44 may be formed of virgin materials, 100% recycled materials, or a mixture of virgin and recycled materials in any desired and suitable range. The yarns may also be formed of other synthetic or natural materials, as desired.

In one preferred embodiment of the present invention, the reinforcing yarns 42 are preferably woven or threaded into a secondary backing fabric 32 that is substantially uniform and symmetrical, which is shown in FIGS. 2–5. For example, the reinforcing yarns 42 may be interwoven at the same time that the secondary backing fabric 32 is being produced.

Figure 6:
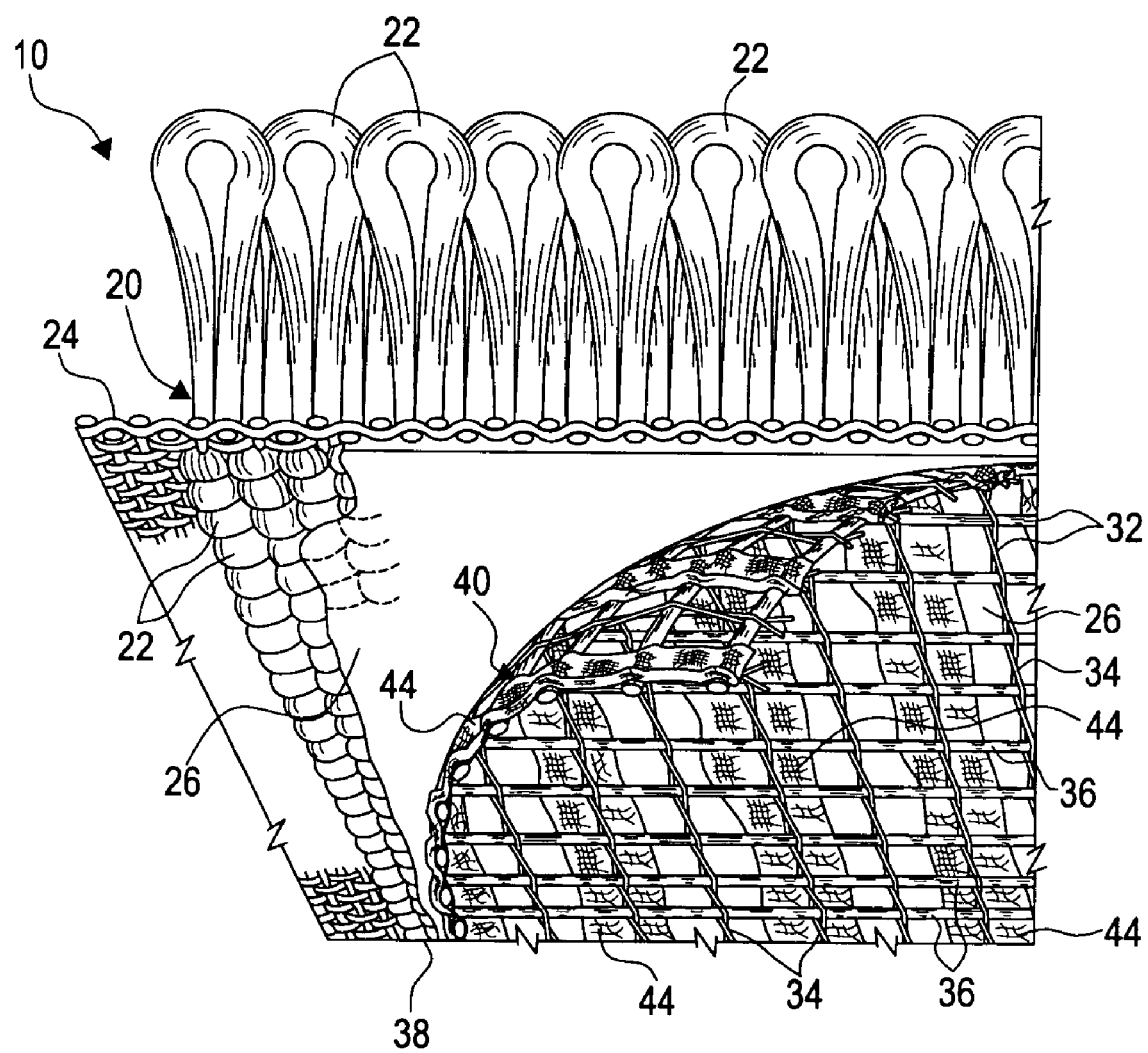
FIG. 6 is a partially exploded perspective view of another secondary backing of the present invention that uses non-woven reinforcing fibers.

In another embodiment shown in FIG. 6, the reinforcing yarns 44 comprise a non-woven material joined to the secondary backing fabric 32, for example by being needle punched thereto. The non-woven materials used may comprise any type of desired non-woven material, either natural or synthetic, such as PET, polyethylene, polyester, or nylon. Other options include fibers, hairs, or a jute-like material, and may be either virgin or recycled materials.

It is also to be appreciated that the present invention is not intended to be limited to any particular design of a secondary backing fabrics 32. For example, the fabric 32 may be woven, knitted, point bonded, thermal fused with use of low melted fibers and other processes can be employed to manufacture a viable secondary backing for use in conjunction with the present invention. Still another option is to use the present invention with a fabric that is connected to a fiber batt, as disclosed in U.S. Pat. No. 6,344,254.

As noted above, it is preferred that the reinforced secondary backing 40 of the present invention—regardless of the embodiment or design—be used in the same manner as a conventional secondary backing 30 to form a laminate carpet. Thus, as with any typical carpet C, a laminate carpet 10 of the present invention would include the following components: a primary backing 24; yarn 22 tufted into the primary backing 24; the reinforced secondary backing 40; and an adhesive 26 disposed intermediate the primary backing 26 and the secondary backing 40. The present invention also includes a method of manufacturing or constructing a carpet 10 using the reinforced secondary backing 40.

Now referring back to FIGS. 2–5, the reinforcing yarns 42 are woven in the fabric 32 to generally extend longitudinally in the warp direction. When considering these illustrated embodiments and others, the quantity and types of reinforcing yarns 42 needed for the present invention to demonstrate an increase in delamination strength is a function of many variables. For example, a major consideration is the type of adhesive 26 used. As one skilled in the art will appreciate, each reinforcing yarn 42 will have more impact with a hot-melt adhesive than with heat-curable latex. As such, fewer reinforcing yarns 42 will achieve a desired increase in delamination strength with a hot-melt adhesive compared to heat-curable latex. Other factors that also vary the quantity or number of reinforcing yarns 42 need to obtain a desired increase in delamination strength include the type of reinforcing yarn 42 used; the materials used to form the reinforcing yarn 42; the size of the yarn(s) 22 or 42; the type of primary backing 24; the type of secondary backing fabric 32; the materials used to form the primary and secondary 24, 32; the weaves used to manufacture the primary and secondary 24, 32; the type of yarn 22 used to form the face of the carpet 10; the tufting pattern of the yarn 22; and other factors appreciated by those skilled in the art. Thus, it is within the scope of the present invention for those skilled in the art to vary the quantity of reinforcing yarns 42 used and their positioning in the secondary backing fabric 32 from the exemplary embodiments discussed or illustrated herein.

As was noted above, it is common in conventional secondary backings 30 for the warp extending yarns 34 of the fabric 32 to be tape yarns and the weft extending yarns 36 to be staple yarns. Thus, when the preferred embodiment of a staple yarn is used as the reinforcing yarn 42 as shown in FIGS. 2–5, the staple yarn is disposed between warp rows formed of tape yarn 34 and interweaved around the weft-extending staple yarns 36 that form the fabric 32.

Figure 3:
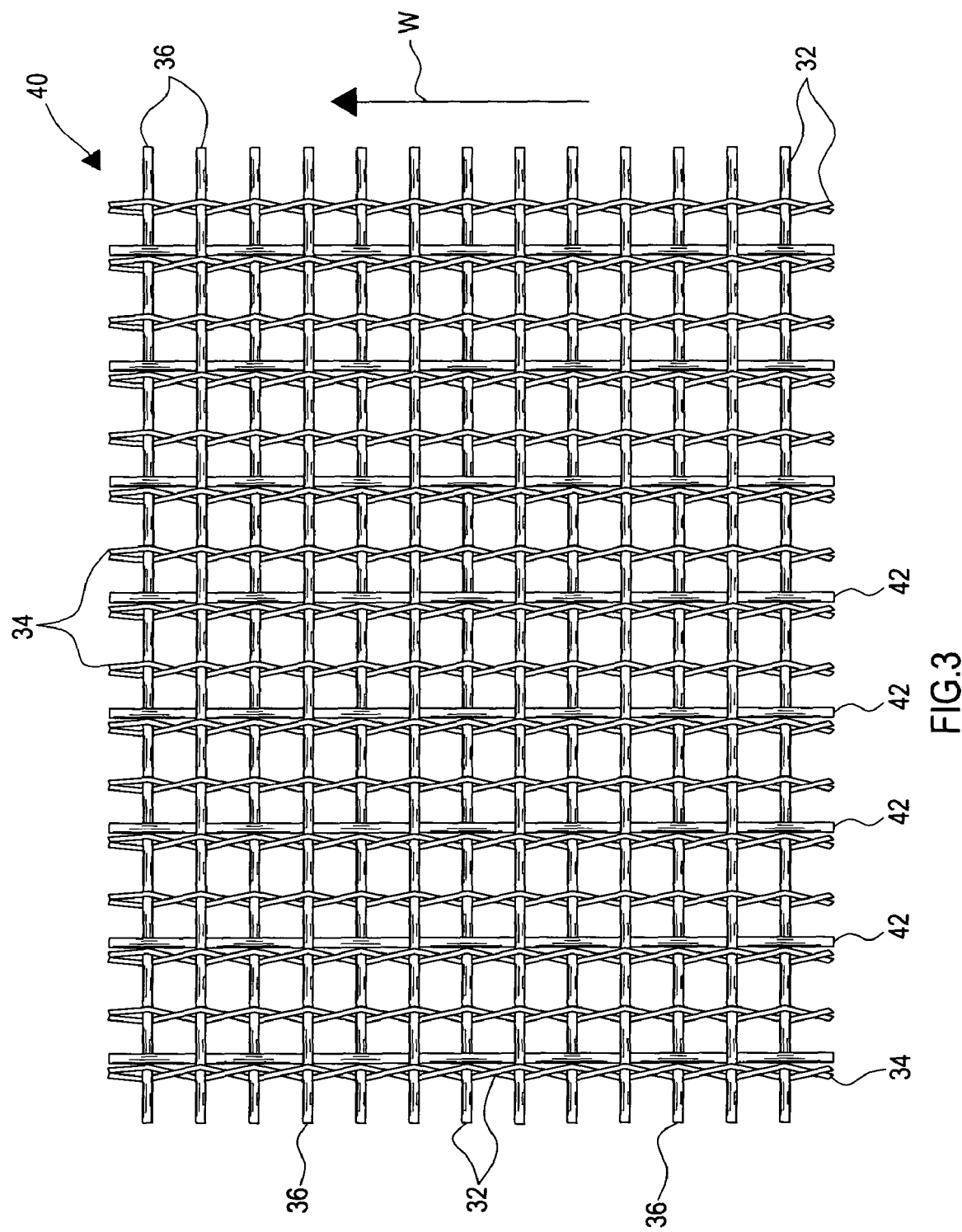
FIG. 3 is a plan view of the reinforced secondary backing shown in FIG. 2.

Referring now to FIG. 3, the reinforcing yarns 42 are spaced apart from each other across at least a portion of the fabric 32 at a distance of one and a half inches or less. Alternatively, the reinforcing yarns 42 may be spaced apart from each other at approximately one-inch intervals. Other separation distances between reinforcing yarns 42 are also contemplated, such as a quarter inch, half inch, three-quarters inch, two inches, three inches, and separations falling between those listed distances. As those skilled in the art appreciate, however, economic considerations make a design woven in smaller increments less viable because of the number of the reinforcing yarns needed to be interwoven, but it is nevertheless within the scope of the present invention.

FIGS. 2–5 show the reinforcing yarns 42 as individual yarns and each yarn is woven or threaded into a single warp-extending row of the fabric 32. Thus, the reinforcing yarns 42 in these embodiments extend exactly warp-wise and there is one single reinforcing yarn 42 interwoven along and into a given row. As such, the reinforcing yarns 42 in these embodiments are laterally spaced apart from each other at least the distance of one warp extending yarn 34 of the secondary backing fabric 32. Nonetheless, there may be more than one reinforcing yarn 42 interwoven along and into one single row within the scope of the present invention, but the associated cost generally outweighs the advantages of such a design.

Figure 4:
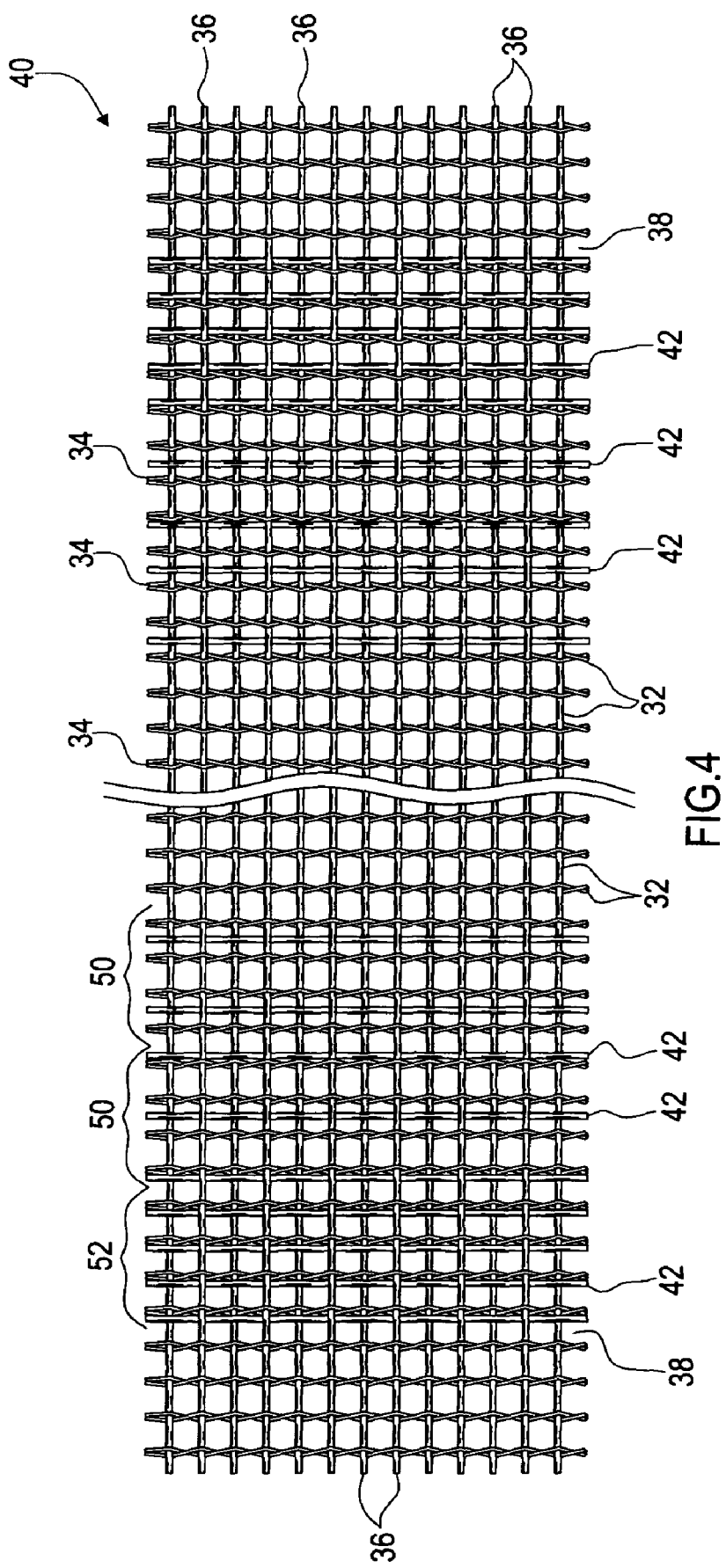
FIG. 4 is also a plan view showing the reinforcing yarns selectively located in bands at desired positions.
Figure 5:
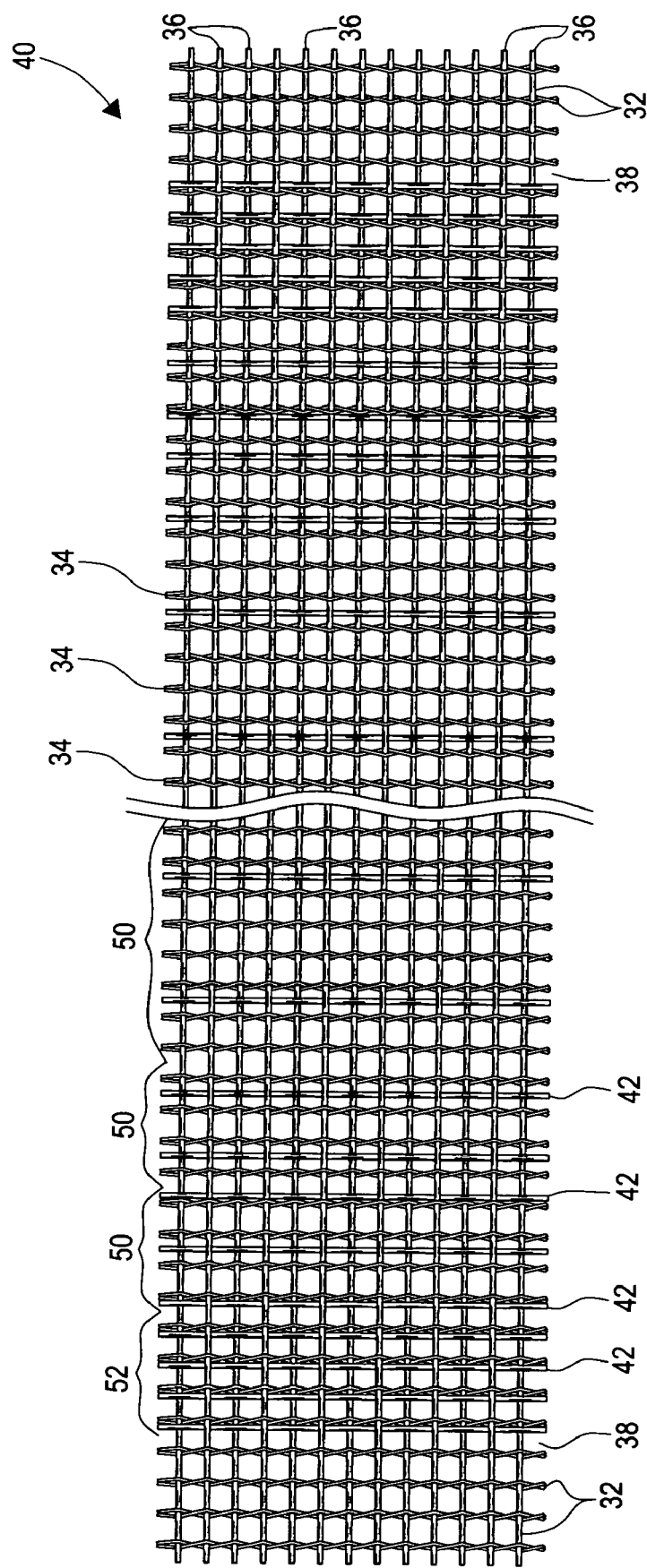
FIG. 5 is a plan view that combines features of the embodiments of FIGS. 3 and 4 together.

It is also contemplated having a plurality of the reinforcing yarns 42 disposed in one or more respective bands 50, 52. Such a band 50, 52 extends in the weft direction a distance less than half of the width of the fabric 32 and includes at least two reinforcing yarns 42. Referring now to FIG. 4, each of the bands 50, 52 may be one inch in width and there are at least two reinforcing yarns 42 in each band.

The bands 50, 52 of the reinforced yarns 42 may be positioned at locations where increased stresses arise or are created in the carpet 10 either from use or in manufacturing. For example, as discussed above, the secondary backing fabric 32 is stretched in the pre-tenter to a small degree and then stretched more substantially in the tenter stage. This stretching creates stresses. Then, in addition, secondary backing fabrics 32 contract in size when exposed to heat in the manufacturing process, primarily in the curing oven. During these times when the secondary backing fabric 32 is heated, its opposed edges are held stationary relative to each other by the tenter device to maintain its width constant. The resulting tension from the stretching and the shrinkage of the secondary backing material thus can break mechanical bonds formed with the adhesive 26, which translates into a weaker carpet. The most pronounced weakness from these manufacturing stresses is near the edges of the carpet.

The bands 50, 52 of reinforced yarns 42 can be selectively placed at the locations where the carpet 10 is weakened, so one embodiment of the present invention includes two of the bands that are each respectively disposed adjacent the opposed edges 38 of the fabric 32. Those two bands—the edge bands 52—may be spaced approximately one to three inches from their respective edge of the manufactured carpet in FIGS. 4 and 5. The reason for this spacing contemplates that a portion of the carpet adjacent its edges will be removed and discarded as selvage waste, which is usually about an inch for a twelve-foot wide carpet. Thus, with the edge bands 52 being spaced approximately one inch from their respective edge, the edge bands 52 are adjacent the actual edge 38 of the carpet 10 after the trimming process is completed.

As another example, a band of the reinforcing yarns may be located in the center of the carpet if it is anticipated that the carpet will be cut in half after manufacturing (i.e., a twelve-foot wide carpet cut into two six-foot wide sections). This cutting would be an additional stress and the present invention may increase the delamination strength of the carpet at this taxed area. Those skilled in the art will also appreciate that bands may be selectively positioned at other areas or regions of the carpet that have a tendency to be weak or fail from manufacturing or subsequently arising stresses.

In locating these bands 50, 52, one skilled in the art will further appreciate that there are different variations as to the dimensions of a band and the number of reinforcing yarns 42 included within a given band. For example, if the band 50, 52 is one inch in width, it is contemplated using at least two reinforcing yarns 42 in the band or even using four or more reinforcing yarns 42 in that one-inch band. As another alternative, the reinforcing yarns 42 may be interwoven into at least every fourth warp-extending row of the fabric 32 or other repeating sequence. Still another option is to space the reinforcing yarns 42 apart at approximately one-inch intervals within the band, in which the band is wider than one inch, as shown by the innermost band 50 illustrated in FIG. 5.

It is also contemplated that not all of the bands 50, 52 are uniform in the number of reinforcing yarns 42 or their width. As an example shown in FIG. 4, there may be four additional reinforcing yarns 42 for the first inch of width adjacent the edge 38 and only two to three additional reinforcing yarns 42 are included per inch in the remainder of the bands 50 moving toward the center.

Figure 2:
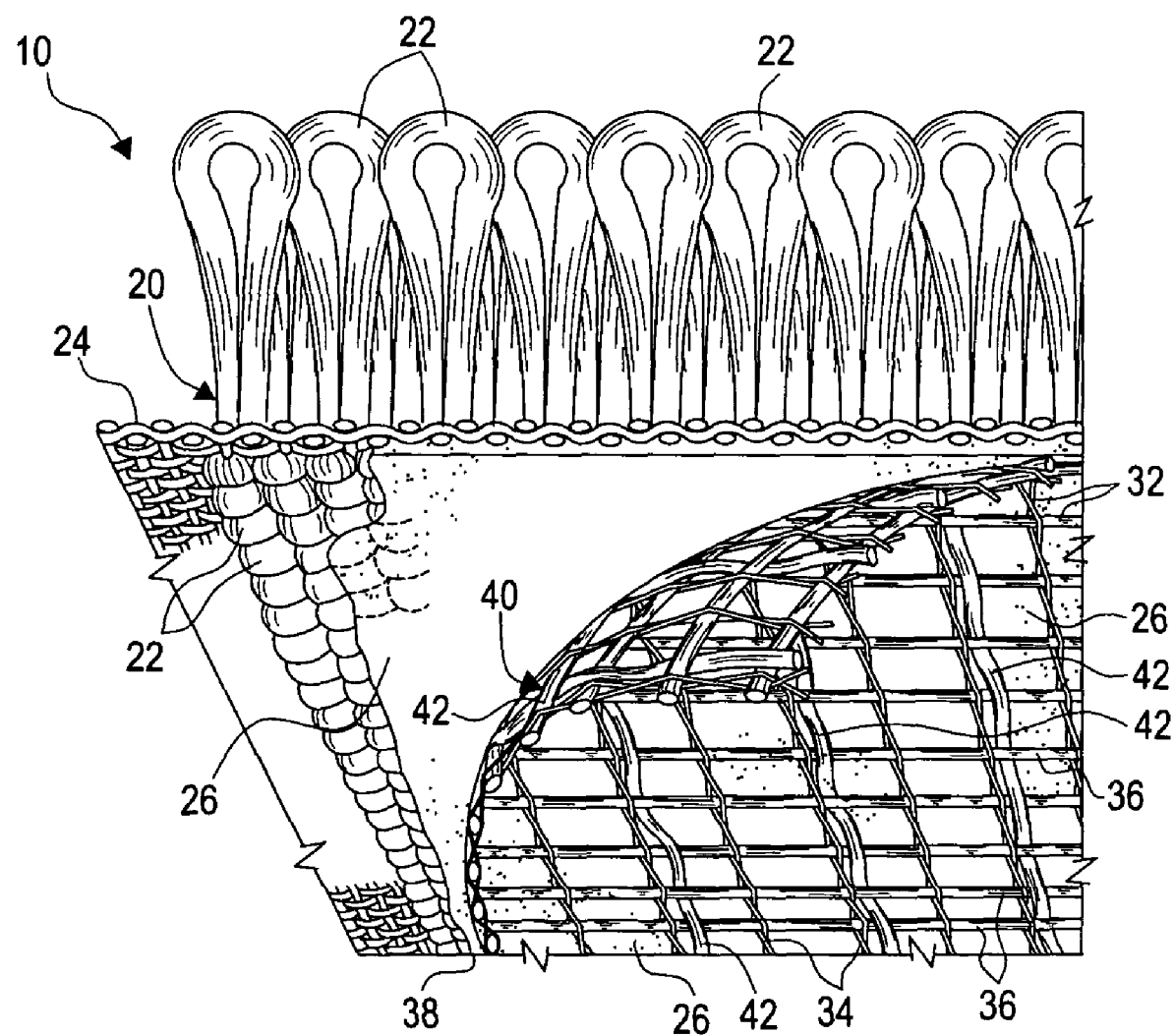
FIG. 2 is a partially exploded perspective view of a carpet formed using one exemplary embodiment the secondary backing of the present invention, in which the reinforcing yarns are spaced apart at a constant distance across the width of the secondary backing fabric.

Yet another variation of the present invention includes reinforcing yarns 42 at a constant spacing (i.e., one-inch intervals) across the width of the fabric 32 (as shown in FIGS. 2 and 3) and, in addition, selectively includes bands 50 of the reinforced yarns 42 at points of increased stress or weakness (as shown in FIG. 4). As an exemplary illustration shown in FIG. 5, one contemplated design includes the reinforcing yarns 42 spaced at one-inch intervals across the majority of the width of the fabric 32 and also includes bands 50, 52 with a higher concentration of reinforcing yarns 42 positioned at locations where lower delamination strengths or other weaknesses typically arise, i.e., adjacent the warp-extending edges 38 of the carpet 10.

Additionally, the reinforcing yarns 42 may be colored, if desired. Such coloration of the reinforcing yarns may serve as carpet pattern guide as disclosed in U.S. Pat. No. 5,484,639, which is incorporated herein by reference in its entirety. The coloration of the reinforcing yarns 42 may also be used for marketing purposes.

Referring now to FIG. 6, another embodiment of the present invention is shown, in which the reinforcing yarns 44 comprise a non-woven material joined to the secondary backing fabric 32. Again, the reinforcing yarns 44 are directed generally in the warp direction. To join the reinforcing yarns 44 and the secondary backing fabric 32, any means known in the art can be used, including, for example, needle punching. More specifically, in one manufacturing method, the secondary backing fabric 32 is placed on a surface and the reinforcing yarns 44 comprising non-woven fibers are laid on top of the fabric 32. The reinforcing yarns 44 and the fabric 32 are then needled together. This process may be automated and continuous. Also, other joining methods know in the art can be used.

Still referring to FIG. 6, placement of these non-woven reinforcing yarns 44 may be at selected locations extending generally in the warp direction and spaced apart from other reinforcing yarns 44 (or bundles thereof). The reinforcing yarns 44 of this embodiment are positioned during manufacturing of the carpet 10 so that they are disposed into the adhesive 26 before the underlying fabric 32 merges into the adhesive. Stated differently, the non-woven reinforcing yarns 44 are disposed closer to the primary backing 24 than the fabric 32 connected to those yarns 44.

When a carpet 10 is manufactured or constructed using the reinforced secondary backing 40 of the present invention, the resultant product may provide a marked improvement in delamination strength over a carpet C made with a conventional secondary backing 30. This increase in delamination strength may be over ten percent and possibly rise to fifteen percent, twenty percent, thirty percent, fifty percent, or even exceed seventy percent. Such an improvement in delamination strength is determined or evaluated by comparing the measured value for a carpet C formed using a fabric 32 that does not include the reinforcing yarns and another carpet 10 using the exact same backing fabric design 32 with the reinforcing fibers 42 or 44 interconnected thereto. All other variable are maintained constant, including the adhesive 26 used, its application method and quantity, curing times and temperatures, the greige goods 20 used, etc. Stated differently, the two carpets C, 10 being compared are manufactured on the same line—preferably sequentially—maintaining all variables constant except the secondary backing, in which one manufacturing run uses the reinforced secondary backing 40 of the present invention and the other run uses the same secondary fabric 30 without including the reinforcing yarns 42 or 44.

To that end, comparative testing has been conducted evaluating carpets 10 manufactured using the secondary backing 40 of the present invention to similarly manufactured and constructed carpets C that did not employ the reinforcing yarns 42. As is known in the art, a tufting manufacturing process was used, in which the primary backing 24 was tufted using a ³⁄₁₆-pattern loop pile machine. More specifically, the primary backing 24 was a 28×13 pic polypropylene material that was tufted with yarn 22 formed of 2407/3 polypropylene in a high-low pattern. The latex 26 used was manufactured by BASF® sold under the tradename Style 6650, and approximately thirty-four (34) ounces per square yard were applied between the primary and secondary backings. The oven operated at a temperature of about 425° F. and the respective carpets 10, C were each heated for approximately five to six (5–6) minutes.

As to the secondary backing fabric 32, both carpets used a 16×5 mesh (warp extending yarns leno weaved and having about 16 ends/inch and the weft yarns having about 5 pics/inch). The warp extending yarns 34 of the fabric were tape yarns and the weft extending yarns 36 were staple yarns, all of which were formed of polypropylene. This secondary backing is sold under the tradename BetterBack® designated as Style number 1003634. Of note, the secondary backings 30, 40 were mechanically "brushed" to increase its bonding strength.

The carpet 10 that included the reinforced yarns 42 used staple yarns formed of polypropylene interwoven into the secondary backing 32. There were two (2) reinforcing yarns evenly spaced per inch. During the manufacturing, the closest reinforcing yarn to one edge of the secondary backing fabric was approximately three (3) inches away and the reinforcing yarns 42 were incrementally interwoven from there moving inwardly toward the center of the carpet a distance of eight (8) inches. The reinforcing yarns 42 were each respectively interwoven into and along a single warp-extending row. Once the selvage waste was removed from the edge of the manufactured laminate carpet, the outermost reinforcing yarn 42 was immediately adjacent the new edge and located below the first tufted warp-extending row of yarn 22. The reinforced secondary backing 40 of the present invention was brushed after the reinforcing yarns were woven into the secondary backing fabric.

Given these parameters, the charts below provide the measured delamination strength for a control carpet and a carpet using the reinforced backing of the present invention:

| CONTROL CARPET | | | |
|---|---|---|---|
| TRIAL NUMBER | SIDE 1 | SIDE 2 | AVERAGE LBS PULL |
| 60403 | 2.6 | 3.0 | 2.8 LBS |
| 72303 | 4.2 | 3.0 | 3.6 LBS |

| CARPET WITH REINFORCED BACKING | | | |
|---|---|---|---|
| TRIAL NUMBER | SIDE 1 | SIDE 2 | AVERAGE LBS PULL |
| 60403 | 5.7 | 5.5 | 5.6 LBS |
| 72303 | 5.1 | 4.7 | 4.9 LBS |

All measurements are listed in pounds.

As those skilled in the art appreciate, delamination strength is measured using a "Resistance to Delamination of the Secondary Backing of Pile Yarn Floor Covering" procedure. The accepted testing protocol in the art is ASTM D 3936-00, which was published in approximately April 2000. However, this delamination measuring procedure was modified when conducting the above measurements (using a variation that the assignee uses as a matter of course). That is, the ASTM D 3936-00 procedure instructs to take one test specimen near the edge "but no nearer to the extreme edge than 5% of its width, and take one specimen from the center area." The testing above was performed starting at what was referred to as the "extreme edge," as this more accurately reflects the carpet's strength to withstand the environmental stresses, strains, and forces experienced after installation.

The ASTM "Resistance to Delamination" protocol specifies that approximately three inches of the specimen is to be delaminated in the test. As one skilled in the art appreciates, a comparison between carpet 10 formed with the reinforced secondary backing 40 and conventional, control carpet C would not be indicative of the increase in strength that the present invention potentially offers if there were no reinforcing yarns 42, 44 in that portion of the specimen being delaminated. Stated differently, delamination tests comparing a carpet formed with a conventional secondary backing 30 and one formed with the reinforced backing 40 would not be telling if the section of carpet tested did not include any reinforcing yarns.

Given the testing results and parameters provided above, the carpet 10 formed with the reinforced secondary backing 40 of the present invention showed an increased resistance to delamination over the conventional, control carpet C.

Although the present invention has been described with reference to specific details of certain embodiments thereof, it is not intended that such details should be regarded as limitations upon the scope of the invention except as and to the extent that they are included in the accompanying claims.

What is claimed is:

1. A carpet, comprising:
   a. a primary backing;
   b. a yarn tufted into the primary backing;
   c. a secondary backing comprising:
      (i) a woven fabric having a plurality of substantially parallel and substantially evenly spaced warp extending yarns intermeshed with a plurality of weft extending yarns, the woven fabric having opposed longitudinal edges extending in the warp direction that define a width therebetween; and
      (ii) a plurality of reinforcing yarns interconnected with the woven fabric and extending substantially in the warp direction; and
   d. an adhesive disposed intermediate the primary backing to the secondary backing.

2. The carpet of claim 1, wherein there are at least two spaced-apart reinforcing yarns located within two inches of each respective edge of the woven fabric.

3. The carpet of claim 1, wherein the reinforcing yarns in the woven fabric are spaced apart from each other approximately one and a half inch intervals or less.

4. The carpet of claim 1, wherein the warp and weft extending yarns are oriented transversely to each other.

5. The carpet of claim 4, wherein the woven fabric is a mesh in which the warp extending yarns use a leno weave and have about 16 ends per inch and the weft yarns have about 5 pics per inch.

6. The carpet of claim 1, wherein the warp extending yarns of the woven fabric are tape yarns and the weft extending yarns are staple yarns.

7. The carpet of claim 6, wherein the reinforcing yarns are staple yarns.

8. The carpet of claim 1, wherein the adhesive is a heat-curable latex.

9. A method of constructing a carpet, comprising:
   a. tufting at least one yarn into a primary backing;
   b. providing a reinforced secondary backing, the secondary backing comprising a woven fabric having a plurality of substantially parallel and substantially evenly spaced warp extending yarns intermeshed with a plurality of weft extending yarns and a plurality of reinforcing yarns interconnected with the woven fabric and extending substantially in the warp direction; and
   c. binding the primary backing to the secondary backing to form the carpet.

10. The method of claim 9, wherein the warp and weft yarns are oriented transversely to each other.

11. The method of claim 9, wherein an adhesive is used to bind the primary backing to the secondary backing.

12. The method of claim 11, wherein the adhesive is heat-curable latex.

13. The method of claim 9, wherein the warp extending yarns of the woven fabric are tape yarns and the weft extending yarns are staple yarns.

14. The method of claim 13, wherein the reinforcing yarns are staple yarns.

15. The method of claim 13, wherein the woven fabric is a mesh in which the warp extending yarns use a leno weave and have about 16 ends per inch and the weft yarns have about 5 pics per inch.

* * * * *